Figure 1:
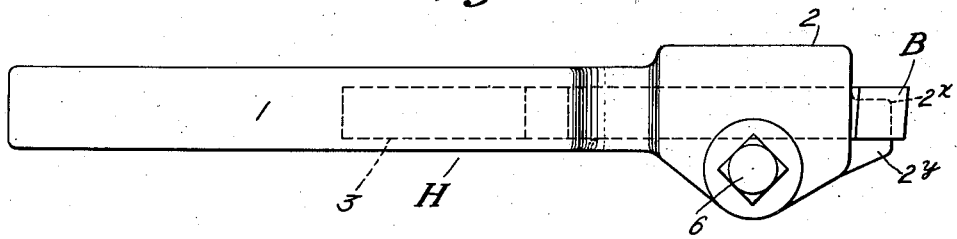

March 12, 1935. E. REANEY 1,993,752

HOLDER FOR CUTTER TOOL BITS

Filed Oct. 25, 1932

INVENTOR-
Ernest Reaney
BY
Nathan, Bowman & Helferich
ATTORNEYS

Patented Mar. 12, 1935

1,993,752

UNITED STATES PATENT OFFICE 1,993,752

HOLDER FOR CUTTER TOOL BITS

Ernest Reaney, Bridgeport, Conn., assignor to The O. K. Tool Company, Inc., New York, N. Y., a corporation of New York Application October 25, 1932, Serial No. 639,441

2 Claims. (Cl. 29—99)

This invention relates to holders for cutter tool bits, particularly of the type used in lathes, shapers, planers, etc. and it has as one of its objects to provide a simplified construction which will effectively hold the cutter bit; which will be easy and inexpensive to manufacture; in which the clamping and unclamping of the cutter bit may be effected with the least possible effort and without annoyance to the user; and in which there shall be no parts to become loose or lost.

Since the advent of high speed tool steel and similar alloys many devices have been provided for holding relatively small pieces of these high grade alloys in relatively large supporting elements of a lower grade metal, the purpose being, of course, to reduce to a minimum the cost of the tool, to provide for adjustment to compensate for resharpening of the cutting elements and to have each portion of the composite tool made of material best suited to its intended purpose. For example, it is common practice to make the holder of strong and tough relatively inexpensive metal suitable for rigidly supporting the cutting bit and to make the cutting bit of a relatively costly alloy which may better withstand the cutting stresses and the heat generated by the cutting operation.

In order that accurate work may be produced it is desirable that, during the cutting operation, the bit be held against all movement relative to its holder. Heretofore many holders have been provided with that end in view. It is to be noted, however, that the devices heretofore provided have, to a great extent, been complicated in construction and costly to manufacture. Many of the prior constructions have included separate elements such, for example, as clamping plates, etc. to secure the bits in their holders. Others have attempted to use set screws, etc., exerting localized pressure on the bit to hold it in place, but these are not entirely satisfactory.

Also in many of the devices heretofore provided the bits necessarily were relatively small and irregularly shaped pieces which were expensive to manufacture and which would admit of only a small number of re-sharpenings, after which they had to be discarded. The present invention provides a tool holder capable of rigidly holding relatively long pieces of bar stock which admits of a great number of re-sharpenings and of which all but a relatively small piece may be utilized, thus minimizing the cost of manufacture of the bits and greatly reducing wastage. To resharpen the present tool bit it is necessary only to release the clamp bolt, advance the cutter bit bar, retighten the clamp bolt and grind the projecting end of the bit. The necessary rake and clearance angles may be formed on the bit during this grinding.

This invention has as a primary object to provide a holder for cutter bits which shall hold the bits, at least, as securely as prior devices and which may be made at a fraction of the cost of the prior complicated constructions. In other words, to obtain extreme simplicity and economy without, in any way, sacrificing efficiency.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:—

Figure 2:
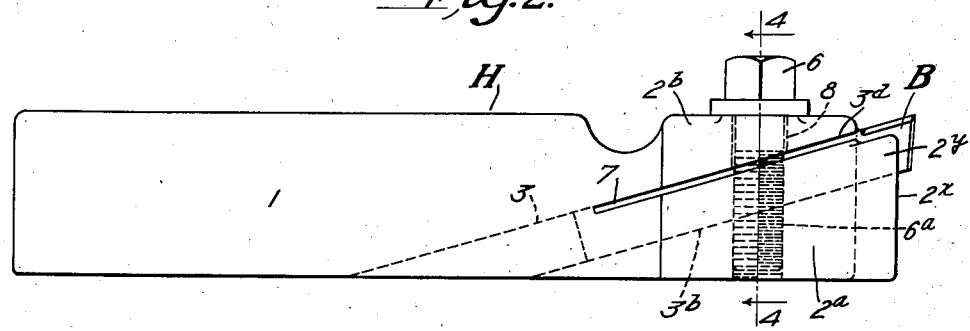
Figure 3:
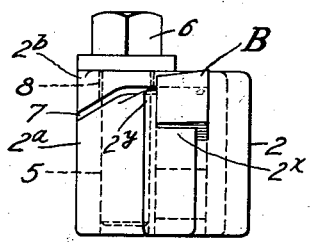
Figure 4:
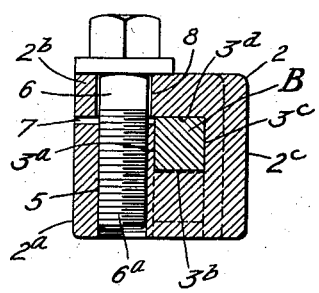

Figure 1 is a plan view of a cutting tool built in accordance with this invention. Fig. 2 is a side elevation thereof. Fig. 3 is a right end view of Fig. 1, and Fig. 4 is a section on the line 4—4 of Fig. 1.

The cutter tool disclosed consists of a holder H comprising a shank portion 1 adapted to be held in a suitable holder on a machine, such for example as the tool post of an ordinary lathe, and a detachable bit B secured in the holder. The holder is preferably made of a strong and durable metal, capable of withstanding great stresses. The bit may be formed wholly or in part of one of the recently developed special alloys, including the so-called cemented carbides, or of any material having cutting characteristics suitable for the work at hand.

The holder may be given a suitable shape and provided with an enlarged head portion 2, by a simple forging operation. Through the head and a portion of the shank there is provided a bore 3 extending in the general direction of the length of the shank bit preferably at a slight angle thereto. This bore receives the cutter but which is securely held therein, as later will be described. The cross sectional shape of the bore corresponds to the cross sectional shape of the bit to be fitted therein, which, as shown in the drawing, preferably is square. A bore of the desired shape may readily be formed in the shank by first drilling a round hole and then passing therethrough a suitably shaped broach. Through the head 2, at one side of the bore 3, there is drilled a hole 5 which later is tapped to receive the threaded end 6a of a suitable clamp bolt 6. To render the head 2 capable of being constricted into gripping contact with the cutter bit therein, the head and a portion of the shank is split, as at 7, in the general direction of bore 3. This split is preferably in line with the upper wall of the bore 3, as shown in Fig. 2, and conveniently may be made by a single saw cut. This saw cut divides the head at one side of the bore into two unequal parts, to wit: a relatively rigid supporting portion 2a and a slightly flexible clamping portion 2b. The portion 2b is counterbored, as at 8, to produce clearance about the shank of the clamp bolt 6. A relatively light side wall 2c connects the portion 2b with the portion 2a as shown in Fig. 4.

The head portion 2 may be formed with a forwardly projecting portion 2x of reduced width adapted to underlie the projecting portion of the cutter bit and give it additional support and rigidity. This portion may also extend upwardly along one side of the cutting portion of the bit as at 2y to resist the thrust of the work against the tool bit. In the drawings there is disclosed a right hand tool and therefore the portion 2y engages the right side of the cutter bit. It is to be understood, however, that the invention likewise may be embodied in a left hand tool, in which case the portion 2y would be located at the opposite side of the cutter bit.

Referring now to Fig. 4 it will be seen that, due to the position and relation of the bore 3 with the split 7, there are provided surfaces 3a, and 3b on the relatively heavy bottom portion 2a of the head, a surface 3c on the lighter and more flexible portion 2c of the head and a surface 3d on the underside of the overhanging clamp portion 2b. From the foregoing it will be perceived that when the bit B is placed in the bore 3 and the clamp screw is tightened the portions 2c and 2b of the head will be deflected inwardly, thereby causing the surfaces 3a, 3b, 3c and 3d to grip the bit B and securely retain it in the holder. It is to be noted that although only a single clamp screw need be tightened the bit is, by reason of the length and width of the clamp surfaces, securely and rigidly held within the holder.

Without further analysis, the foregoing will so fully reveal the gist of this invention that others can, by applying current knowledge, readily adapt it for various utilizations by retaining one or more of the features that, from the standpoint of the prior art, fairly cnstitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A lathe tool adapted to fit the conventional lathe tool-post comprising an elonagted one-piece holder member having a reduced portion formed on the upper surface thereof intermediate its ends thereby dividing the holder into two portions, the portion of said holder member forward of said reduced portion being enlarged and constituting a head portion and the portion of said holder member to the rear of the reduced portion constituting the shank portion, said body member being provided with a rectangular bit receiving bore extending from the front of said head portion rearwardly and downwardly therethrough into said shank portion and emerging from the underside of said shank portion at a point intermediate its ends; a clamp element integral with said head portion formed by a slit in the side wall thereof which extends laterally from the said bore and in the plane of the upper surface thereof, said slit extending rearwardly and downwardly from the front of said head portion and being coextensive with the length thereof; a tool bit adapted to fit within said bore; and screw means carried in said head portion at the side of said bore remote from the normal working side of the holder adapted when actuated to move said clamp element forward of the reduced portion firmly into clamping engagement with the tool bit inserted in said bore, said clamping engagement with said bit being substantially coextensive with the length of said head portion of the holder and facilitated by said reduced portion.

2. A one-piece lathe tool holder comprising a holder member proper provided with a shank portion adapted to fit the conventional lathe toolpost, a neck portion and a head portion, said holder having a rectangular bit receiving bore formed therein extending from the front of said head portion rearwardly therethrough in the general direction of the longitudinal axis of said holder, through the said neck portion and into the said shank portion, said neck portion being formed by recessing the top of the holder intermediate its ends; a rectangular bit member fitted to and enclosed by said bore, the forward portion of said bit projecting from the bore for the purpose of performing tooling operations; spring clamp means integral with the head portion of said holder formed by a slit extending laterally from said bore to the side of the head remote from the normal working side thereof and in the plane of the upper surface of the bit inserted therein, said slit diverging from the top of the head portion and extending the full length of the said head portion and terminating in the said neck portion of the holder thereby forming a relatively flexible head section overlying said bit, the cross sectional area of the overlying section being relatively small at said neck portion; and screw means having a floating fit in the overlying head section and a threaded connection with the section of the head underlying said bit adapted when actuated to move said sections toward each other thereby to effect clamping of said bit throughout the area of said head portion.

ERNEST REANEY.